Aug. 14, 1934.     R. B. ENRIGHT     1,970,035
DRAWING DEVICE
Filed Feb. 6, 1932
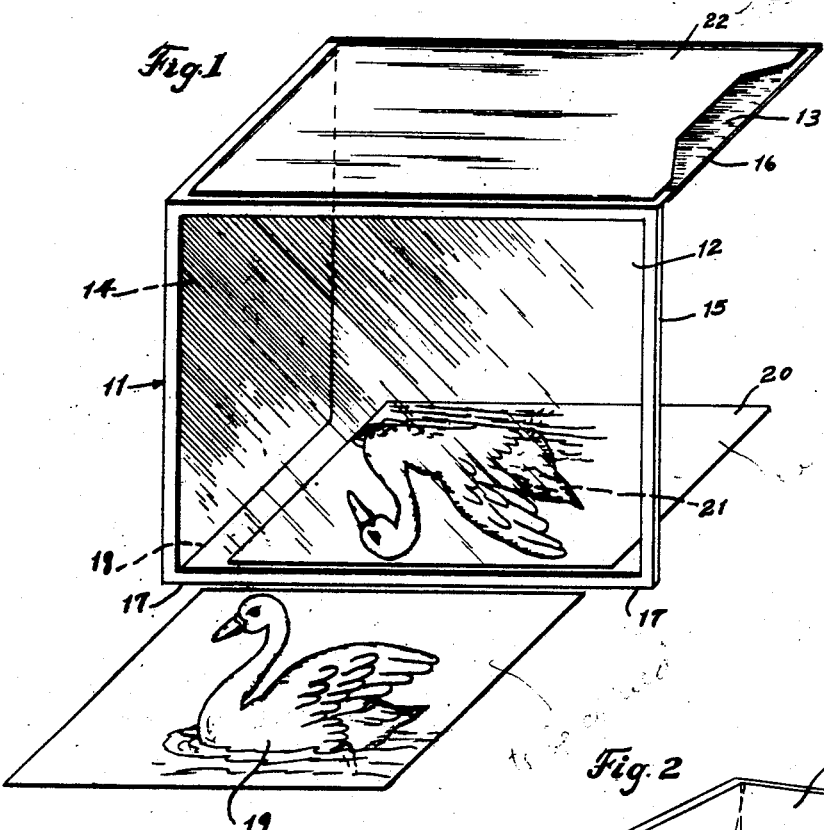
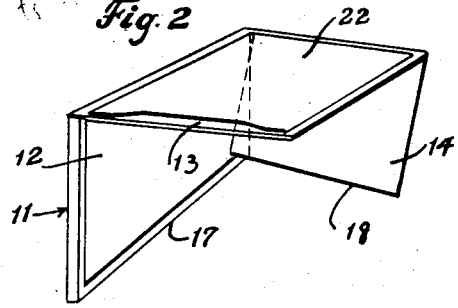
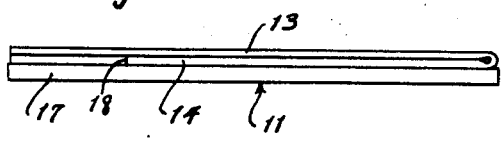
INVENTOR
Robert B. Enright
BY ATTORNEY Patented Aug. 14, 1934

1,970,035

UNITED STATES PATENT OFFICE 1,970,035

DRAWING DEVICE

Robert B. Enright, New York, N. Y., assignor to Saul Robinson, Brooklyn, N. Y.

Application February 6, 1932, Serial No. 591,310

1 Claim. (Cl. 88—1)

This invention relates to a new and improved device, which may appropriately be termed a "Copy-kit", and which device serves to develop in man the ability for conscientious seeing, that is, to see small objects and pictures on hand so as to produce in the brain of the person a clear mental picture of the article or the like, and to develop at the same time the ability to reproduce on a sheet of paper or other material, by drawing or painting, a correct picture of the article seen.

In the production of this device it is a main object of the invention, to produce an article of the said sort, which may be used with advantage by scientists, artists and other persons, in order to facilitate the performing of tasks of the said kind in their daily work. It is further another main object of the invention, to produce, what may be called a toy in the educational class for children, which toy develops in children the said ability which is most valuable in real life, and develops this ability in a way which gives to the child an endless source of entertainment, pleasure and joy.

In order to attain these objects, I contrived a device, in which the main part is a glass-pane, which is placed in a certain upright position on the table, between the article or picture to be copied and a sheet of paper or the like. The article to be copied, the glass-pane and the sheet are arranged on the table in such a manner, that by the one surface of the said glass-pane a picture of the said article is reflected into the eye of the person using the device, while at the same time the person can look through the glass-pane to the other side of the same, and see the sheet of paper or the like placed on the table at this other side of the pane. Then the person while looking at the object, can at the same time guide his or her hand, so as to make an absolutely correct copy of the observed object by drawing or painting on the said sheet holding the reflection. In the preferred embodiment of the invention my new and improved device comprises further a dark vertical rear-wall, continuous with the glass pane and a roof-wall, which rear-wall and roof-wall shield off lateral light-rays and the sky-light from the sheet to be drawn or painted on, and from the rear-side of the glass-pane, so that both the reflected picture of the object and the picture, which the person is reproducing, are seen more clearly. Another valuable feature of my new and improved device consists therein, that the aforesaid rear-wall or the base-support of the paper-sheet or the like may be shaped, so as to form a pocket, into which can be placed blanks of paper-sheet or sample copies of pictures, or the like.

In the drawing I have shown a preferred embodiment of the invention, whereby in the different figures the same reference-members are used to designate the same parts of the copy-kit. In the drawing Figure 1 is a perspective view of the new copy-kit when being used for drawing a copy of a picture;

Fig. 2 is a similar perspective view of the copy-kit alone, shown on a somewhat smaller scale, and slightly folded; while Fig. 3 shows the same copy-kit when folded entirely together so as to be stored away in a small cardboard box.

Referring more particularly to the drawing, 11 indicates a preferably wooden frame, which contains an ordinary glass-pane 12. To the one longer side of the frame is fastened, by means of a strip of cloth or by hinges, the top-wall 13, which may consist of a square piece of cardboard, of dark color, and again to the one smaller corner of the top-wall 13 is fastened in a similar manner the rear-wall 14, which consists likewise of a square piece of dark colored card-board.

The use of this new and improved copy-kit can be seen clearly from Figure 1, and is as follows: The copy-kit, unfolded so as to form an open corner of three sides or walls arranged at rectangular angles with reference to each other as shown in Figure 2, is placed on the table in such a position, that the free smaller edges of the frame 11 and of the top-wall 15 and 16 respectively are directed to the right side to the person using the kit, and the kit stands on the table with the free longer edges of the frame and of the rear-wall 17 and 18 respectively. The person looks therefore towards the outer (left) side of the glass-pane in a slightly downward and oblique direction. At the same outer side of the glass-pane is placed on the table the object or picture 19 to be reproduced, and on the other side behind the glass-pane 12 and within the corner formed by the kit is placed on the table a blank sheet 20 of paper or other suitable material. The person using the kit then sees on the glass-pane 12 a reflected picture 21 of the displayed object or sample picture. When reaching with the right hand into the corner fold of the kit, the person can follow on the paper blank 20 the lines of the model, as seen on the glass-pane, thereby producing on the paper-blank an exact copy picture of the model or sample-picture.

In this way every feature of the model, when followed by the eye on the reflected picture on the glass-pane, settles in the consciousness of the person, and trains him or her, in producing exact and clear mental pictures of the contemplated objects, and at the same time the hand is being trained in reproducing these mental pictures by drawings or paintings.

As said before, one side of the top-wall 13 (or of the rear-wall) is preferably provided with a pocket or paper-bag 22, into which may be placed the blank-sheets to be sketched on, or the sample-pictures and the like. Furthermore there may be added to the device as described and illustrated, a set of drawing or painting materials such as lead pencils and eraser-rubbers, colored crayons, brushes and colors and so on, and these supplemental materials may be stored in another pocket, provided at the other wall (the rear wall) of the device.

If the copy-kit is not used it may be folded together, as shown in Figure 3, so that it takes only little space and is more convenient for transporting, storing and marketing the whole outfit in small-sized boxes of card-board or the like.

It is evident that the invention is not limited to the exact details of construction as described before and illustrated, but various modifications may be made as to these details wherever it is found convenient. Thus for instance instead of the aforesaid glass pane 12, there may be used a board or sheet of any other transparent and reflecting material, such as celluloid, cellophane, waxed paper, mica, and so on.

I claim

A device for facilitating the copying of pictures, and the like, comprising, in combination, a rectangular side wall of transparent and reflecting material adapted to be erected, standing vertically between the article to be copied and a sheet on which a copy is to be made, a rectangular opaque top wall hinged at the upper edge of the side wall and extending horizontally above the sheet on which the copy is to be made, and a rectangular opaque rear wall hinged at the rear edge of the said top wall and having the same height as the first said side wall, so that the three walls can be set up to form a three-sided corner with right angles between the three sides, and standing with the edges of the side wall and of the rear wall on a table so as to surround the sheet, on which the copy is to be made, on two adjoining sides.

ROBERT B. ENRIGHT.